United States Patent

Mezger et al.

(10) Patent No.: US 6,505,602 B1
(45) Date of Patent: Jan. 14, 2003

(54) METHOD OF OPERATING AN INTERNAL COMBUSTION ENGINE

(75) Inventors: Werner Mezger, Eberstadt (DE);
Thomas Schuster, Brackenheim (DE);
Andreas Roth, Muehlacker-Lomersheim (DE); Gerd Grass, Schwieberdingen (DE);
Ruediger Weiss, Moetzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/937,297
(22) PCT Filed: Feb. 25, 2000
(86) PCT No.: PCT/DE00/00534
§ 371 (c)(1), (2), (4) Date: Nov. 30, 2001
(87) PCT Pub. No.: WO00/58618
PCT Pub. Date: Oct. 5, 2000

(30) Foreign Application Priority Data

Mar. 25, 1999 (DE) .......................................... 199 13 407

(51) Int. Cl.⁷ .......................... F02B 17/00; F02D 41/40
(52) U.S. Cl. ....................................... 123/295; 123/305
(58) Field of Search ................................ 123/295, 305, 123/491; 701/105

(56) References Cited

U.S. PATENT DOCUMENTS

| | | | | |
|---|---|---|---|---|
| 5,832,901 A | * | 11/1998 | Yoshida et al. .............. | 123/478 |
| 5,875,756 A | * | 3/1999 | Kamura et al. ............. | 123/295 |
| 5,878,713 A | * | 3/1999 | Kadota ........................ | 123/305 |
| 6,058,907 A | * | 5/2000 | Motose et al. ............... | 123/305 |
| 6,334,428 B1 | * | 1/2002 | Nagatani et al. ............ | 123/305 |
| 6,401,688 B2 | * | 6/2002 | Teraji et al. ................. | 123/295 |

FOREIGN PATENT DOCUMENTS

| | | |
|---|---|---|
| DE | 197 39 786 | 4/1998 |
| EP | 0 849 455 | 6/1998 |
| EP | 0 849 460 | 6/1998 |
| JP | 60 013950 | 1/1985 |

* cited by examiner

*Primary Examiner*—Erick Solis
(74) *Attorney, Agent, or Firm*—Walter Ottesen

(57) ABSTRACT

An internal combustion engine (1), especially for a motor vehicle, is described, which has a combustion chamber (4) into which fuel can be injected in at least two operating modes. Each of the injections has an injection start angle and an injection duration. Furthermore, a control apparatus 18 is provided for control (open loop and/or closed loop). An injection end angle can be determined by the control apparatus (18) from the injection start angle and the injection duration. Likewise, a check can be made by the control apparatus (18) as to whether an injection interrupt angle is exceeded by the injection end angle.

11 Claims, 2 Drawing Sheets

METHOD OF OPERATING AN INTERNAL COMBUSTION ENGINE

FIELD OF THE INVENTION

The invention relates to a method for operating an internal combustion engine especially of a motor vehicle, wherein fuel is injected into a combustion chamber in at least two modes of operation. The injection includes an injection start angle and an injection duration. Likewise, the invention relates to an internal combustion engine, especially for a motor vehicle, having a combustion chamber into which fuel can be injected in at least two modes of operation. The injection includes an injection start angle and an injection duration. The internal combustion engine includes a control apparatus for control (open loop and/or closed loop).

BACKGROUND OF THE INVENTION

A method of this kind and an internal combustion engine of this kind are known, for example, from a so-called gasoline direct injection in motor vehicles. There, fuel is injected into the combustion chamber of the engine in a homogeneous operation during the induction phase or, in a stratified operation, during the compression phase. The homogeneous operation is preferably provided for the full-load operation of the engine; whereas, the stratified operation is suitable for idle operation or part-load operation. In such a direct-injecting internal combustion engine, there is a switchover between the two above-mentioned operating modes, for example, in dependence upon the requested torque.

The starting of the engine is carried out in homogeneous operation. Especially for a cold start, it is possible that a relatively long injection duration is required because of the pressure which is still low and operates on the fuel, in order to be able to inject the wanted fuel mass into the combustion chamber and to start the engine reliably. This can lead to the situation that the engine transfers already from the induction phase into the compression phase and that the pressure, which develops thereupon in the combustion chamber, is greater than the pressure operating on the fuel. In this case, the fuel and vapor from the combustion chamber would be blown back which, in any case, should be avoided.

SUMMARY OF THE INVENTION

It is an object of the invention to provide a method for operating an internal combustion engine with which a reliable start can be carried out, even a cold start.

This task is solved in accordance with the invention by a method of the above-mentioned type in that an injection end angle is determined from the injection start angle and the injection duration and that a check is made as to whether an injection interrupt angle is exceeded by the injection end angle. For an internal combustion engine of the kind referred to above, the task of the invention is solved in that an injection end angle can be determined by the control apparatus from the injection start angle and the injection duration and that a check can be made by the control apparatus as to whether an injection interrupt angle is exceeded by the injection end angle.

With the determination of the injection end angle, it is possible that this angle be compared to the injection interrupt angle. From this comparison, it can be derived as to whether the intended injection would or would not exceed the injection interrupt angle. It can then be decided in dependence thereon as to whether any measures are required as to how the intended fuel mass can be injected into the combustion chamber without fuel and vapor being blown back from the combustion chamber.

The invention thereby opens the possibility to inject the wanted fuel mass and to nonetheless avoid a blowback of the fuel. The procedure of the invention can be applied under all operating conditions of the engine and therefore also for a cold start. In this way, a reliable starting of the engine under all conditions is achieved with the invention.

At this point, it is emphasized that each of the above-mentioned angles as well as each of the angles described hereinafter is assigned a corresponding time duration. All angles could therefore be replaced by corresponding time durations. The conversion is dependent upon the rpm of the engine.

In the event that the injection interrupt angle is not exceeded, it is especially advantageous in the invention when the injection is begun at the injection start angle. In this case, which does not include the danger of a blowback of the fuel from the combustion chamber, the injection start angle is therefore not changed. The intended fuel mass is therefore injected into the combustion chamber ahead of the injection interrupt angle.

If, in contrast, the injection interrupt angle is exceeded, then, in an especially advantageous embodiment of the invention, it is provided that a changed injection start angle is so determined that the injection interrupt angle is just no longer exceeded and that the injection is started at the changed injection start angle. In this way, it is ensured that, for an approximately constant rpm, the injection in no case exceeds the injection interrupt angle. In this way, on the one hand, a blowback of fuel from the combustion chamber is reliably avoided. On the other hand, it is likewise avoided that the injection of fuel ends prematurely and that thereby too little fuel is injected into the combustion chamber. Especially the latter is essential for a reliable starting of the engine.

In an advantageous further embodiment of the invention, the injection start angle is changed to "early". It is especially advantageous when the injection start angle is changed starting from the injection interrupt angle toward "early" by the injection duration. According to the invention, the injection is therefore started precisely when the remaining time duration up to the interruption of the injection just corresponds to the injection duration. The injection is then precisely at the time point of the provided interrupt or is ended at the injection interrupt angle.

In a further advantageous embodiment of the invention, the change of the injection start angle is limited to a limit angle which is especially engine temperature dependent. In this way, it is achieved that the injection start cannot be changed arbitrarily to "early"; instead, an earliest possible injection start in each case is maintained.

The application of the invention is especially advantageous in a first operating mode wherein the fuel is injected into the combustion chamber of the engine during the induction phase. This operating mode defines the homogeneous operation.

Likewise, it is especially advantageous when the invention is used at a pressure, which acts on the fuel, which is less than a limit pressure. In this way, it can be achieved that a change of the injection start angle is only possible when the pressure, which acts on the fuel, is low and therefore, for an interrupt, too little fuel would be injected for a reliable operation of the engine. For a high pressure acting on the fuel, the injection times are so short that no interruption can occur any longer. The entire computations are no longer carried out in order to save computation time.

An especially advantageous embodiment of the invention is applying the same during start of the engine. When starting, especially for a cold start, the pressure on the fuel is low. At the same time, a large quantity of fuel must be injected into the combustion chamber in order to ensure a reliable starting of the engine. An interruption of the injection during starting could therefore lead to a stalling of the engine. For this reason, it is especially advantageous to prevent an interruption of the injection during starting of the engine and, in lieu thereof, carry out the change of the injection start angle in accordance with the invention. In this way, it is, on the one hand, achieved that the intended fuel mass can be completely injected into the combustion chamber. On the other hand, a blowback of fuel out of the combustion chamber is reliably avoided.

Of special significance is the realization of the method of the invention in the form of a control element which is provided for a control apparatus of an engine, especially of a motor vehicle. A program is stored on the control element which is capable of being run on a computer, especially on a microprocessor, and is suitable for executing the method according to the invention. In this case, the invention is realized by a program stored on the control element so that this control element, which is provided with the program, defines the invention in the same way as the method which the program can carry out. Especially an electric storage medium can be used as a control element, for example, a read-only-memory or a flash memory.

Further features, application possibilities and advantages of the invention will become apparent from the following description of embodiments of the invention which are illustrated in the drawing. All described or illustrated features define the subject matter of the invention by themselves or in any desired combination independently of their summary in the patent claims or their dependency as well as independently of their formulation or presentation in the description and/or in the drawing.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
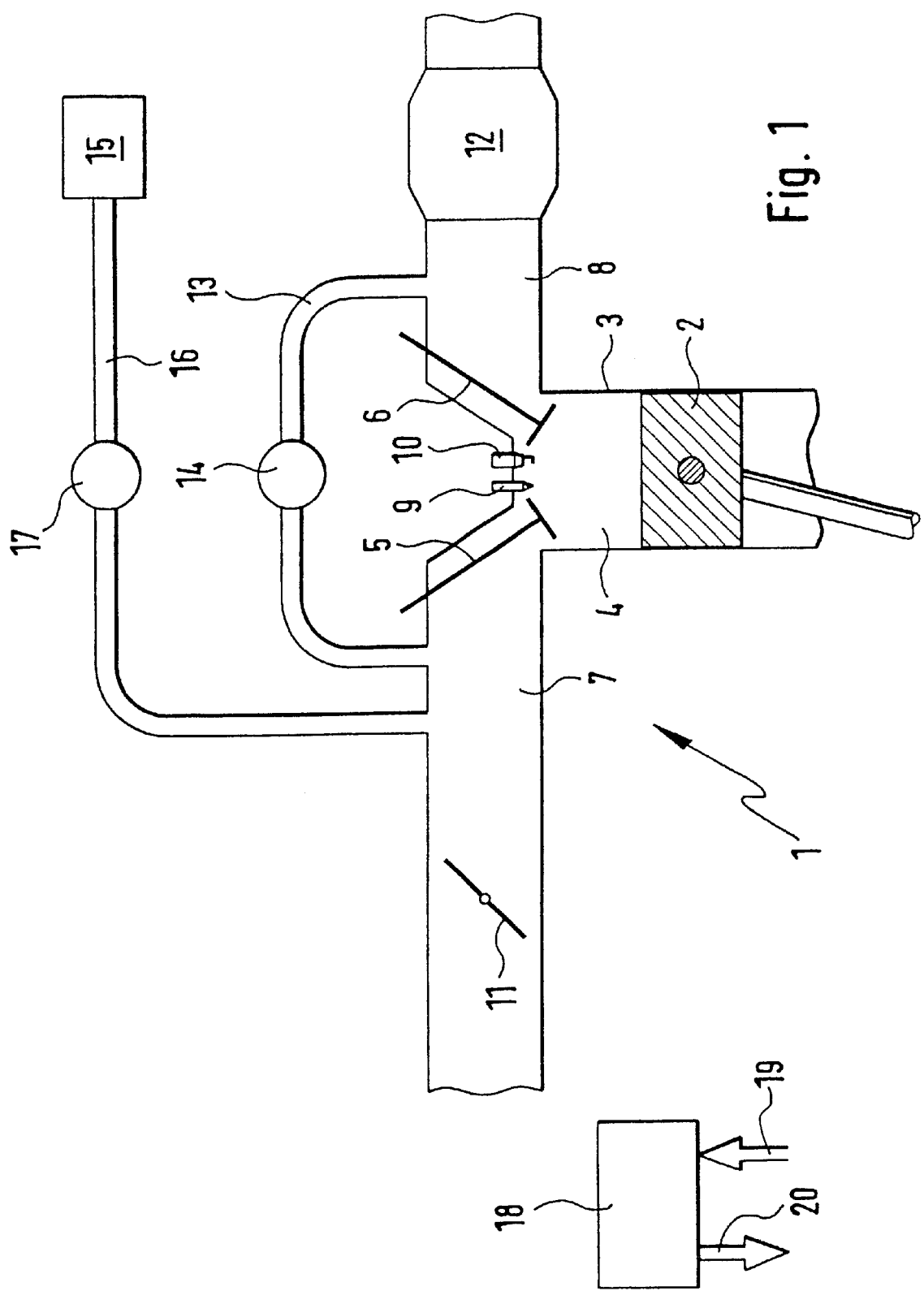
FIG. 1 is a schematic block circuit diagram of an embodiment of an internal combustion engine according to the invention; and, FIG. 2 is a schematic block circuit diagram of an embodiment of a method according to the invention for operating the internal combustion engine of FIG. 1.

In FIG. 1, an internal combustion engine 1 of a motor vehicle is shown wherein a piston 2 is movable back and forth in a cylinder 3. The cylinder 3 is provided with a combustion chamber 4, which is, inter alia, delimited by the piston 2, an inlet valve 5 and out valve 6. An intake manifold 7 is coupled to the inlet valve 5 and an exhaust-gas pipe 8 is coupled to the outlet valve 6.

An injection valve 9 and a spark plug 10 project into the combustion chamber 4 in the region of the inlet valve 5 and of the outlet valve 6. Fuel can be injected into the combustion chamber 4 via the injection valve 9. The fuel in the combustion chamber 4 can be ignited with the spark plug 10.

A rotatable flap 11 is mounted in the intake manifold 7 and air can be supplied via the throttle flap to the intake manifold 7. The quantity of air is dependent upon the angular position of the throttle flap 11. A catalytic converter 12 is accommodated in the exhaust-gas pipe 8 and this catalytic converter serves to purify the exhaust gases arising because of the combustion of the fuel.

An exhaust-gas recirculation pipe 13 leads from the exhaust-gas pipe 8 back to the intake manifold 7. An exhaust-gas recirculation valve 14 is accommodated in the exhaust-gas recirculation pipe 13 and, with this valve 14, the quantity of the exhaust gas, which is recirculated to the intake manifold 7, can be adjusted.

A tank-venting line 16 leads from a fuel tank 15 to the intake manifold 7. A tank-venting valve 17 is mounted in the tank-venting line 16 and, with this valve 17, the quantity of the fuel vapor from the fuel tank 15, which is supplied to the intake manifold 7, can be adjusted.

The piston 2 is displaced by the combustion of the fuel in the combustion chamber 4 into a back and forth movement which is transmitted to a crankshaft (not shown) and applies a torque thereto.

Input signals 19 are applied to a control apparatus 18 and these signals define measured operating variables of the engine 1. For example, the control apparatus 18 is connected to an air-mass sensor, a lambda sensor, an rpm sensor and the like. Furthermore, the control apparatus 18 is connected to an accelerator pedal sensor which generates a signal which indicates the position of an accelerator pedal, which can be actuated by the driver, and therefore indicates the requested torque. The control apparatus 18 generates output signals 20 with which the performance of the engine 1 can be influenced via actuators or positioning devices. For example, the control apparatus 18 is connected to the injection valve 9, the spark plug 10 and the throttle flap 11 and the like and generates the signals required to drive the same.

The control apparatus 18 is, inter alia, provided to control (open loop and/or closed loop) the operating variables of the engine 1. For example, the fuel mass, which is injected by the injection valve 9 into the combustion chamber 4, is controlled (open loop and/or closed loop) by the control apparatus 18 especially with respect to a low fuel consumption and/or a low development of toxic substances. For this purpose, the control apparatus 18 is provided with a microprocessor on which a program is stored in a memory medium, especially in a flash memory, and this program is suited to execute the above-mentioned control (open loop and/or closed loop).

In a first operating mode, a so-called homogeneous operation of the engine 1, the throttle flap 11 is partially opened or closed in dependence upon the desired torque. The fuel is injected into the combustion chamber 4 by the injection valve 9 during an induction phase caused by the piston 2. The injected fuel is swirled by the air inducted simultaneously via the throttle flap 11 and is essentially uniformly distributed in the combustion chamber 4. Thereafter, the air/fuel mixture is compressed during the compression phase in order to then be ignited by the spark plug 10. The piston 2 is driven by the expansion of the ignited fuel. In homogeneous operation, the developing torque is dependent essentially upon the position of the throttle flap 11. The air/fuel mixture is adjusted as close as possible to lambda=1 or lambda<1 with a view to a low generation of toxic substances.

In a second operating mode, a so-called homogeneous lean operation of the engine 1, the fuel is injected into the combustion chamber 4 as for the homogeneous operation during the induction phase. However, in contrast to the homogeneous operation, the air/fuel mixture can also occur with lambda>1.

In a third embodiment, a so-called stratified operation of the engine 1, the throttle flap 11 is opened wide. The fuel is injected into the combustion chamber 4 by the injection valve 9 during a compression phase caused by the piston 2 and locally in the immediate vicinity of the spark plug 10 as well as at a suitable interval in time ahead of the ignition time point. Then, with the aid of the spark plug 10, the fuel is ignited so that the piston 2 is now driven in the following work phase by the expansion of the ignited fuel. The occurring torque is substantially dependent upon the injected fuel mass in stratified operation. The stratified operation is essentially provided for idle operation and part-load operation of the engine 1.

If required, other operating modes are also conceivable.

There can be a switchover back and forth between the described operating modes. Switchovers of this kind are carried out by the control apparatus 18. Triggering of a switchover takes place by an operating state of the engine 1 or by a function of the control apparatus 18.

For starting, the engine 1 is operated in the first operating mode, the homogeneous operating mode. This is characterized by "h" in the signals of FIG. 2.

Figure 2:
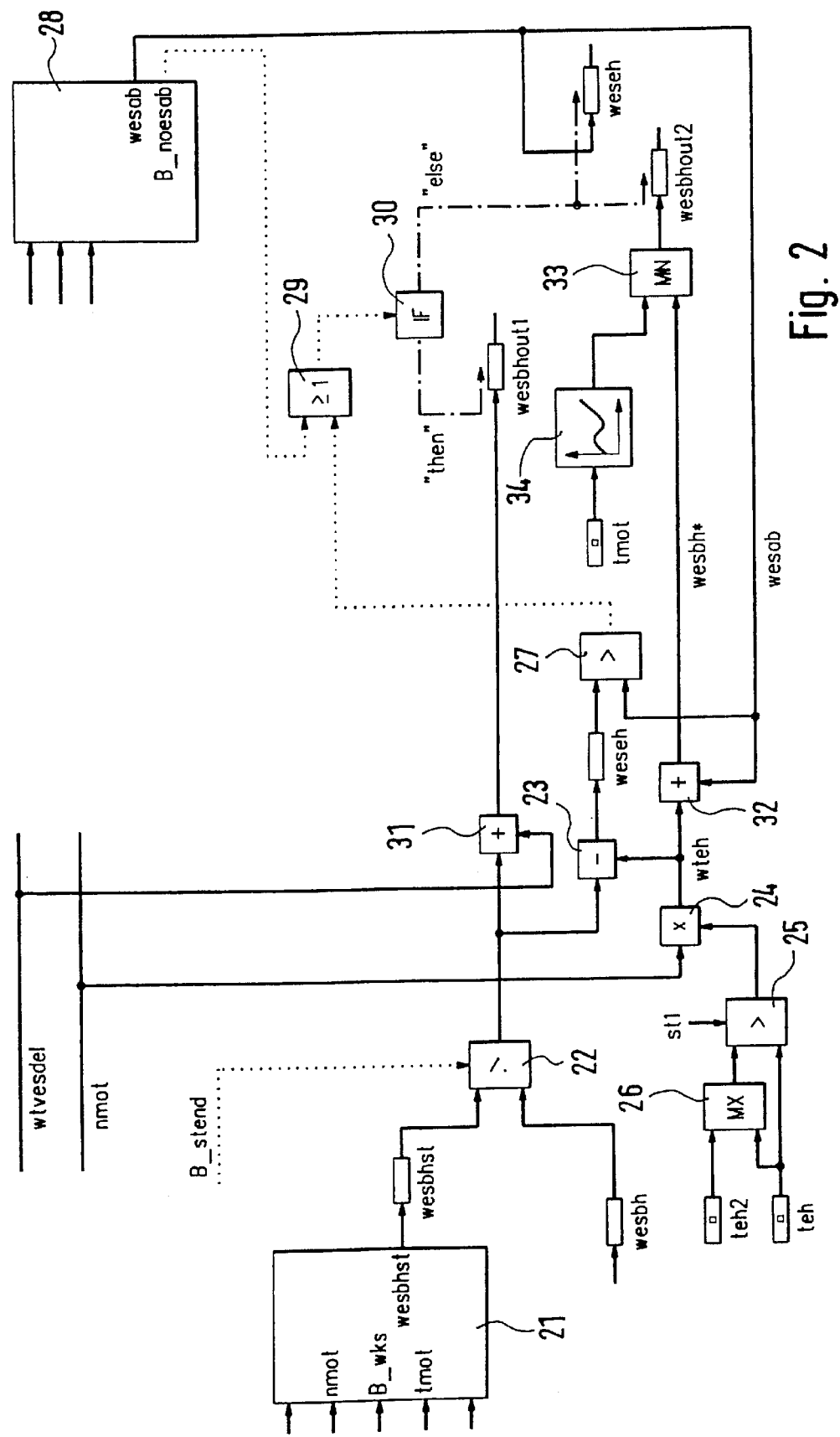

In FIG. 2, a method is shown which can be executed by the control apparatus 18 and is suitable to control (open loop and/or closed loop) the starting of the engine 1. The blocks shown in FIG. 2 are represented in the control apparatus 18 by programs.

A block 21 is provided to determine an injection start angle wesbhst for the start of the engine 1. This injection start angle wesbhst is generated by block 21, inter alia, in dependence upon: the rpm nmot of the engine 1, a bit B_wks with which a repeat of a cold start is characterized and the temperature tmot of the engine 1.

The injection start angle wesbhst for the starting is supplied to a changeover switch 22 to which an injection start angle wesbh for the normal operation of the engine 1 is also applied. The changeover switch 22 is controlled by a bit B_stend which characterizes the end of the start operation. During starting of the engine 1, the changeover switch 22 is in the switch position shown in FIG. 2 because of the bit B_stend. When starting, the injection start angle wesbhst for the start is transmitted by the changeover switch.

An injection duration angle wteh is subtracted from the injection start angle wesbhst by a block 23. At this point, it is noted that, in connection with angles or time durations of the injections, the direction "early" is always considered. A subtraction therefore means that, for example, the injection duration angle is added to the injection start angle in the time sequence. Likewise, it is noted that angles and time durations can be converted one into the other via the rpm nmot of the engine.

The injection duration angle wteh is determined from the injection duration teh. For this purpose, the injection duration teh is multiplied by the rpm nmot of the engine 1 in block 24.

In addition, it can be adjusted that the injection duration teh cannot drop below a minimum value teh2. For this purpose, a changeover switch 25 must be switched into the position not shown in FIG. 2 with the aid of a control signal st1. Then, because of an interposed maximum value stage 26, at least the minimum value teh2 is transmitted even if the injection duration teh is less.

An injection end angle weseh is present at the output of block 23 because of the subtraction of the injection duration angle wteh from the injection start angle wesbhst. This injection end angle weseh is compared to an injection interrupt angle wesab in block 27. The comparison takes place in that a check is made as to whether the injection end angle weseh is greater than the injection interrupt angle wesab.

The injection interrupt angle wesab is determined by a block 28 in dependence upon several operating variables of the engine 1. The injection interrupt angle wesab defines that angle at which, at the latest, an injection must be ended because, otherwise, the problem exists that the fuel is blown back from the combustion chamber 4 into the injection nozzles 9.

This problem is especially present for a cold start of the engine 1 wherein the pressure, which acts on the fuel, is still low. Because of the low pressure, a large time duration is needed in order to inject the wanted fuel mass into the combustion chamber. Because of this large time duration, it is possible that the injection can extend beyond the induction phase up to the compression phase. There, the compression pressure, which is built up in the combustion chamber 4, can become greater than the pressure which acts on the fuel by the injection nozzles 9 so that the fuel and vapor is blown back into the injection nozzles 9 as mentioned.

If the injection end angle weseh is greater than the injection interrupt angle wesab, that is, the "greater than" condition of block 27 is satisfied, then the block 27 generates a "1". This case is then given when, in the actual time-dependent sequence, the injection is ended ahead of the injection interrupt angle wesab, that is, when the injection end angle weseh does not exceed the injection interrupt angle wesab.

The "1", which is generated by the block 27, is transmitted via an OR logic element 29 to a block 30. Because of the applied "1", it is inconsequential as to which signal is present at the other input of the OR logic element 29.

Block 30 is an "if-then-else" function. If a "1" is applied to block 30, then the "then" function is executed, otherwise, the "else" is executed.

Because of the applied "1", the function, which is characterized in FIG. 2 by "then", is enabled by the block 30. This means that an injection start angle wesbhout1, which is to be outputted, is made available and defines the angle of the injection start which is to be outputted to the corresponding injection valve 9.

The injection start angle wesbhout1 is generated by a block 31 by an addition of the injection start angle wesbhst and a signal wtvesdel. The signal wtvesdel is an angle range within which the injection valve 9 is premagnetized. The injection start angle wesbhst is shifted by this angle range to "early" in the actual time sequence.

The "then" function discussed above is directed to that case wherein the injection end angle weseh does not exceed the injection interrupt angle wesab.

However, if the injection end angle weseh is less than the injection interrupt angle wesab (that is, the "greater than" condition of block 27 is not satisfied), then the block 27 generates a "0". This case is given when, in the actual time sequence, the injection would be ended after the injection interrupt angle wesab, that is, when the injection end angle weseh would exceed the injection interrupt angle wesab.

If, in this case, the signal, which is applied to the other input of the OR logic element 29, is likewise "0", then the function, which is characterized in FIG. 2 by "else", is enabled by the block 30. This means that an injection start angle wesbhout2, which is to be outputted, as well as the injection end angle weseh are made available. The injection start angle wesbhout2 then defines (as the injection start angle wesbhout1) the angle of the injection start which is to be outputted to the corresponding injection valve 9.

The injection start angle wesbhout2 is generated by a block 32. To this, the block 32 adds the injection duration angle wteh and the injection interrupt angle wesab. This addition means that, in the actual time course, a computation is made toward "early" starting from the injection interrupt angle wesab. The result of the addition is an injection start angle wesbh* which is just so selected that the intended injection duration angle wteh in each case does not cause the injection interrupt angle wesab to be exceeded while the rpm remains approximately constant. In this case, the injection is ended precisely at the injection interrupt angle wesab.

The injection start angle wesbh* is supplied to a minimum value selection 33 which also receives an input signal from an engine temperature-dependent characteristic line 34. The minimum value selection 33 outputs a maximum value for the injection start angle wesbhout2. In this way, the injection start angle wesbhout2 corresponds either to the injection start angle wesbh* if this angle is less than the maximum value generated by the characteristic line 34, or the injection start angle wesbhout2 corresponds to this maximum value and therefore to a maximum "early" limit angle for the injection start in the sense of the actual time sequence.

At this point, it is again mentioned that, in correspondence to the quoted "if-then-else" function of the block 30, always only either the injection start angle wesbhout1 or the injection start angle wesbhout2 is generated and outputted to the corresponding injection valve 9.

If a "0" is applied to both inputs of the OR logic element 29, then, as mentioned, the injection end angle weseh is also generated in the context of the "else" function. Corresponding to FIG. 2, the injection end angle weseh is set equal to the injection interrupt angle wesab. In this way, it is achieved that, as the injection end angle weseh, the value is no longer present which exceeds the injection interrupt angle wesab (this value led to the change of the injection start and therefore to the injection start angle wesbhout2); instead, it is achieved that the correct value of the injection end is available as the injection end angle weseh, namely, the value of the injection interrupt angle wesab.

Except for the output signal of the block 27, an already mentioned further signal is applied to the OR logic element 29. This signal is a bit "B_noesab" generated by the block 28 in dependence upon several operating variables of the engine 1. The bit B_noesab indicates whether an interruption of the injection is permitted or not.

The bit B_noesab is "0" when an interrupt of the injection is permitted. In this case, the bit B_noesab, as already explained, has no influence on the OR logic element 29. The "if-then-else" function is thereby only driven in dependence upon the output signal of the block 27. This has the consequence that the injection start for an approximately uniform rpm is always just so changed that no interrupt of the injection takes place.

The bit B_noesab is, however, "1" when an interrupt of the injection is not permitted. This is the case, for example, for a pressure which acts on the fuel at the end of the injection nozzles 9 and which exceeds a limit pressure. With this "1" of the bit B_noesab, the output signal of the OR logic element 29 is, independently of the output signal of the block 28, in each case also "1" so that the "then" function is executed in each case by the block 30. In this way, no change of the injection start angle wesbhout1 toward "early" is carried out.

What is claimed is:

1. A method for operating an internal combustion engine including an internal combustion engine of a motor vehicle, the method comprising the steps of:

injecting fuel into a combustion chamber during at least two operating modes of the engine with the injection having an injection start angle (wesbhst) and an injection duration (teh);

determining an injection end angle (weseh) from said injection start angle (wesbhst) and said injection duration (teh);

checking as to whether said injection end angle (weseh) exceeds an injection interrupt angle (wesab);

if said injection interrupt angle (wesab) is exceeded, then determining a changed injection start angle (wesbhout2) in such a manner that said injection interrupt angle (wesab) is just no longer exceeded;

starting the injection at said changed injection start angle (wesbhout2); and, limiting the change of said injection start angle (wesbhout2) to a limit angle.

2. The method of claim 1, wherein said limit angle is dependent upon the temperature of the engine.

3. The method of claim 1, comprising the further step of shifting said changed injection start angle (wesbhout2) to "early".

4. The method of claim 1, comprising the further step of shifting said changed injection start angle (wesbhout2) toward "early" by the injection duration (teh) starting from said injection interrupt angle (wesab).

5. The method of claim 1, comprising the further step of starting the injection at an injection start angle (wesbhout1) if said injection interrupt angle (wesab) is not exceeded.

6. The method of claim 1, wherein the method is applied in a first operating mode wherein fuel is injected into the combustion chamber of the engine during the induction phase.

7. The method of claim 1, wherein the method is applied when the pressure, which acts on the fuel, is less than a limit pressure.

8. The method of claim 1, wherein the method is applied during the start of the engine.

9. A computer program product having a program, the computer product comprising:

a carrier readable by a computer and said program being stored on said carrier; and, when executed by the computer, said program being suitable for carrying out a method for operating an internal combustion engine including an internal combustion engine of a motor vehicle, the method including the steps of:

injecting fuel into a combustion chamber during at least two operating modes of the engine with the injection having an injection start angle (wesbhst) and an injection duration (teh);

determining an injection end angle (weseh) from said injection start angle (wesbhst) and said injection duration (teh);

checking as to whether said injection end angle (weseh) exceeds an injection interrupt angle (wesab);

if said injection interrupt angle (wesab) is exceeded, then determining a changed injection start angle (wesbhout2) in such a manner that said injection interrupt angle (wesab) is just no longer exceeded;

starting the injection at said changed injection start angle (wesbhout2); and, limiting the change of said injection start angle (wesbhout2) to a limit angle.

10. The computer program product of claim 9, wherein said carrier is a read-only-memory.

11. An internal combustion engine including an engine for a motor vehicle, the internal combustion engine comprising:

a combustion chamber into which fuel can be injected in at least two operating modes, the injection having an injection start angle (wesbhst) and an injection duration (teh);

a control apparatus for controlling (open loop and/or closed loop) the engine; and, said control apparatus including: means for determining an injection end angle (weseh) from said injection start angle (wesbhst) and said injection duration (teh); means for checking as to whether said injection end angle (weseh) exceeds an injection interrupt angle (wesab); means for determining a changed injection start angle (wesbhout2) when said injection interrupt angle (wesab) is exceeded with the determination being made in such a manner that said injection interrupt angle (wesab) is just no longer exceeded; means for starting the injection at said changed injection start angle (wesbhout2); and, means for limiting the change of said injection start angle (wesbhout2) to a limit angle.

* * * * *